Aug. 17, 1926. 1,596,754
J. D. MOSCHELLE
REENFORCED TUBING
Filed Oct. 30, 1923
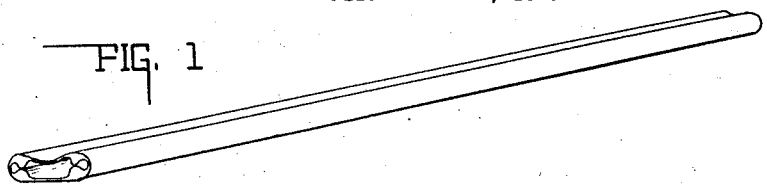
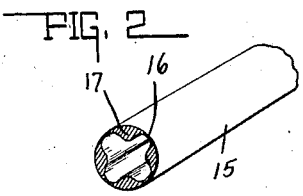 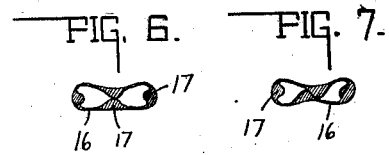
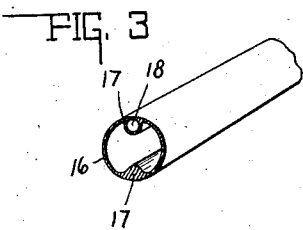 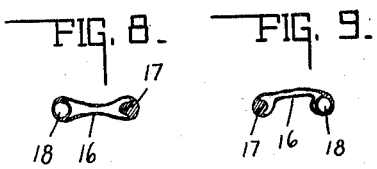
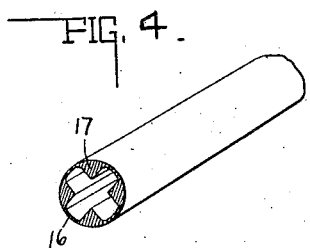 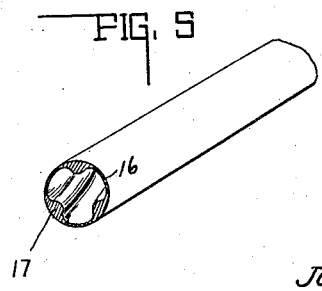
INVENTOR.
JUDSON D. MOSCHELLE.
BY 
ATTORNEYS.

Patented Aug. 17, 1926.

1,596,754

UNITED STATES PATENT OFFICE.

JUDSON D. MOSCHELLE, OF INDIANAPOLIS, INDIANA.

REENFORCED TUBING.

Application filed October 30, 1923. Serial No. 671,790.

The object of making this invention is to provide a surgical drain that will not collapse or close completely so as not to function and be injurious to the patient.

In surgical operations it is often necessary to provide a rubber tube or drain leading from the interior of the wound or part surgically treated and extending through the tissue of the body to the outside for draining the wound. Its length depends upon the location of the part to be drained, so that the tubes are from two to twelve or more inches long. Surgeons have heretofore had great difficulty with the drains employed because they would collapse and close under the pressure of the flesh on them and cease to drain and would cause injury to the patient. Such drains as heretofore employed have been rubber tubes made thin so as to be light in weight and, therefore, not uncomfortable for the patient and otherwise be capable of use as a surgical drain. They often have to bend and the danger of collapse and closure is always imminent.

The chief feature of this invention consists in providing a thin rubber tube with longitudinally-extending ribs or thickened portions, that is, the wall of the tube is thin in places so the tube can yield and longitudinally thick in other places so that when it does yield, the ribs will engage each other or the opposite wall of the tube and prevent it from entirely closing.

The full nature of the invention will be understood from the accompanying drawings and the following description and claim:

In the drawings, Figure 1 is a perspective view of a drain tube partially collapsed. Figs. 2, 3, 4 and 5 are perspective views of short surgical tubes having different internal ribbed constructions. Figs. 6 and 7 are cross sections of the tube shown in Fig. 2 collapsed in various positions. Figs. 8 and 9 are similar sections of the tube shown in Fig. 3 collapsed.

The surgical tube constituting this invention is preferably a round tube 15 made of rubber and having the major portion 16 of the wall thin and having internal ribs or thickened portions preferably extending longitudinally of the tube, as shown, in position to engage each other to prevent the closure of the passage through the tube when the tube is collapsed.

In Fig. 2 there is shown a tube having four longitudinal and inwardly extending ribs 17 equidistant from each other. In Figs. 6 and 7 the collapsed condition of this tube is shown and as there appears there will remain at all times at least two passageways through the tube for drainage.

In Fig. 3 the tube is provided with two oppositely-located internal ribs 17, one of them being provided with a longitudinal perforation 18. This perforation 18, extending longitudinally through the rib 17, serves two purposes. It never collapses because its walls are relatively thick and, therefore, acts as a drain when the tube is in collapsed condition, as shown in Figs. 8 and 9 and an instrument can be inserted into the perforation 18 for straightening or withdrawing the tube.

In Fig. 4 the ribs 17 are angular instead of round or oval, as shown in the preceding figures. In Fig. 5 the ribs are somewhat spiral, although they extend longitudinally, the value of the spiral arrangement being to more completely prevent the collapse of the tube than if the ribs were straight.

The invention claimed is:—

A surgical draining tube for draining cavities after surgical procedures, formed with a thin soft and readily collapsible rubber wall, the inner surface of said thin rubber wall being provided with a plurality of inwardly extending rib-like stiffening portions formed of the same soft rubber as the thin portion of the tube but of relatively greater thickness, said rib-like portions being spaced equidistant from each other about the inner surface of said tube, whereby said tube will retain its softness and flexibility and also be prevented from entirely collapsing so as to permit at all times the drainage and the escape of the gases.

In witness whereof, I have hereunto affixed my signature.

JUDSON D. MOSCHELLE.